(12) United States Patent
Tembreull et al.

(10) Patent No.: US 7,362,060 B2
(45) Date of Patent: Apr. 22, 2008

(54) SELF-LEARNING CONTROL SYSTEM AND METHOD FOR CONTROLLING FAN SPEED

(75) Inventors: Thomas M. Tembreull, Homer, MI (US); Eric L. Charbonneau, Kalamazoo, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/908,731

(22) Filed: May 24, 2005

(65) Prior Publication Data

US 2006/0267525 A1   Nov. 30, 2006

(51) Int. Cl.
  *H02P 5/00* (2006.01)
  *H02P 5/46* (2006.01)
  *H02P 7/08* (2006.01)
(52) U.S. Cl. .................. 318/66; 318/599; 318/811
(58) Field of Classification Search .............. None
  See application file for complete search history.

(56) References Cited

U.S. PATENT DOCUMENTS

| | | | |
|---|---|---|---|
| 4,327,559 A | 5/1982 | Spethmann | |
| 4,425,766 A | 1/1984 | Claypole | |
| 4,930,320 A | 6/1990 | Ide et al. | |
| 5,294,050 A * | 3/1994 | Hoffman et al. | 237/2 A |
| 5,408,837 A | 4/1995 | Omura | |
| 5,557,182 A * | 9/1996 | Hollenbeck et al. | 318/432 |
| 5,613,370 A * | 3/1997 | Pichotta | 62/228.1 |
| 5,623,835 A | 4/1997 | Layman et al. | |
| 5,735,134 A | 4/1998 | Liu et al. | |
| 5,799,869 A * | 9/1998 | Pichotta | 237/8 A |
| 6,199,398 B1 * | 3/2001 | Takeuchi et al. | 62/323.1 |
| 6,213,061 B1 | 4/2001 | Bartolazzi et al. | |
| 6,328,000 B1 | 12/2001 | Hawkins et al. | |
| 6,367,270 B2 | 4/2002 | Niimi et al. | |
| 6,415,746 B2 | 7/2002 | Kobayashi et al. | |
| 6,453,853 B1 | 9/2002 | Hawkins et al. | |
| 6,637,229 B1 | 10/2003 | Forrest et al. | |
| 6,671,459 B1 * | 12/2003 | Bultman | 388/804 |

* cited by examiner

*Primary Examiner*—Lincoln Donovan
*Assistant Examiner*—Erick Glass

(57) ABSTRACT

A feedback control logic system for commanding a particular air conditioning unit fan speed is driven by a pulse-width modulated signal from a control unit. The engine control unit decrements the pulse-width modulated signal to the air conditioning unit fan and allows the fan to run for a predetermined time. If a particular function, such as shutting off of an air conditioner pressure switch or other sensor, has not been achieved within the predetermined time, the engine control unit again decrements the pulse-width modulated signal.

20 Claims, 2 Drawing Sheets

SELF-LEARNING CONTROL SYSTEM AND METHOD FOR CONTROLLING FAN SPEED

TECHNICAL FIELD

The present invention relates to cooling systems, and more particularly, to a controller controlling a fan through self-learning control logic for optimizing fan usage.

BACKGROUND ART

In recent years, air conditioners have become essential to improving comfort and convenience in using a vehicle. Therefore, many technologies have been developed to improve the functions of air conditioners. As is well known, an air conditioner relieves heat generated by an engine of a vehicle, by passengers, and through external solar radiation, so that the passengers can feel more comfortable while riding in the vehicle.

Air conditioners or air conditioning systems typically include, among other things, condensers and compressors, whereby the condenser is cooled by a fan, and the compressor is controlled, at least partially, through a pressure switch. The use of fans to move air through heat exchangers or condensers is well known in, for example, the field of air conditioning and the field of motor vehicle cooling. A fan for such an application may include a motor, a hub member, and plural blades.

It is a constant goal to optimize efficiency of air conditioning systems while minimizing associated costs, including tooling costs, part cost, and later fuel costs to the consumer. The present invention is directed towards these ends.

SUMMARY OF THE INVENTION

According to one aspect of the present invention, a self-learning feedback control logic system and method is included for commanding a particular fan speed (driven by a pulse-width modulated (PWM) signal from an engine control unit (ECM)) for cooling a vehicle air conditioning system. The system and method accommodates variation from clutch-to-clutch, variation in air conditioning systems from vehicle-to-vehicle, and variation in ambient temperatures.

In accordance with another embodiment of the present invention, a feedback control logic method for commanding a particular air conditioning unit fan speed is driven by a pulse-width modulated signal from a control unit. The control unit decrements the pulse-width modulated signal to the air conditioning unit fan and allows the fan to run for a predetermined time. If a particular function, such as shutting off of an air conditioner pressure switch, has not been achieved within the predetermined time, the engine control unit again decrements the pulse-width modulated signal and allows the fan to run with the new pulse-width modulated signal for the predetermined amount of time. Further, the system continues to decrement the pulse-width modulated signal until the particular function is achieved.

Other features, benefits, and advantages of the present invention will become apparent from the following description, when viewed with regard to the attached drawings and appended claims.

BRIEF DESCRIPTION OF THE DRAWINGS

For a complete understanding of the invention, there will now be described some embodiments thereof, given by way of example, reference being made to the accompanying drawings, in which.

DETAILED DESCRIPTION

Figure 2:
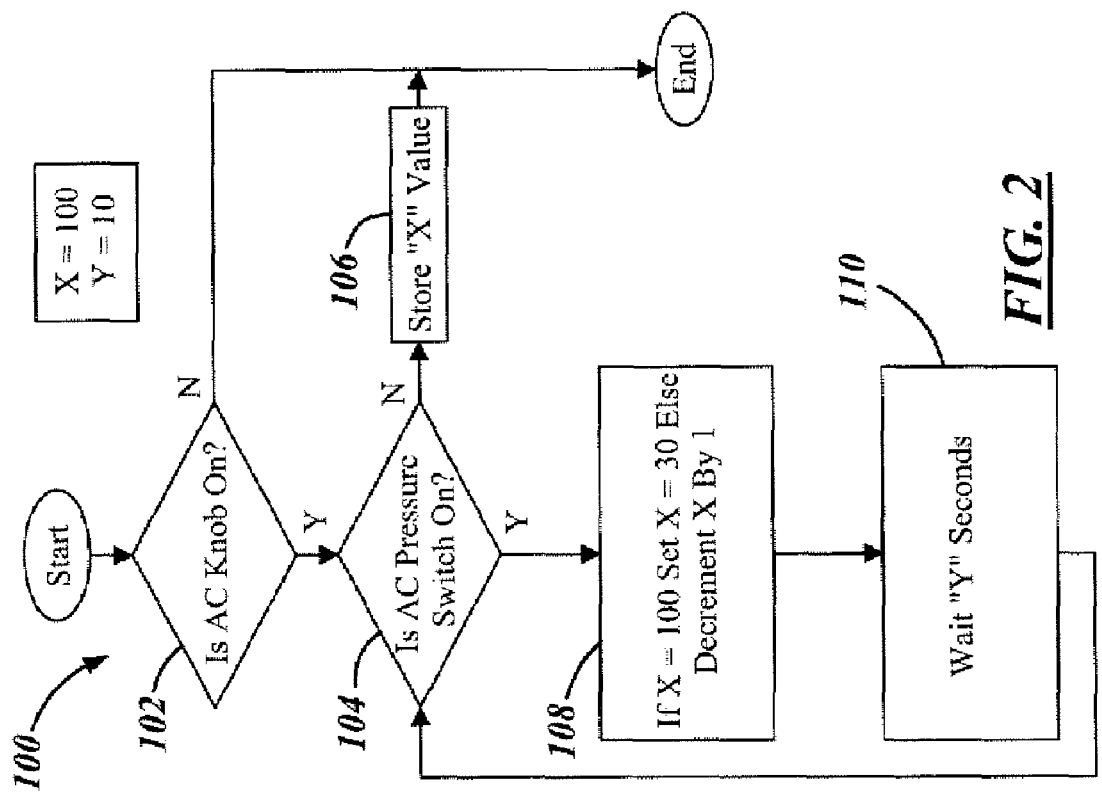
FIG. 2 is a logic flow diagram of a method for controlling fan speed in accordance with another embodiment of the present invention.

The present invention is illustrated with respect to a vehicle system 10 including an air conditioning system (AC) cooling fan 14, particularly suited to the automotive field. The present invention is, however, applicable to various other uses that may require fans, such as aerospace vehicles, maritime vehicles, and other such vehicles, as will be understood by one skilled in the art. In each of the following figures, the same reference numerals are used to refer to the same components.

Figure 1:
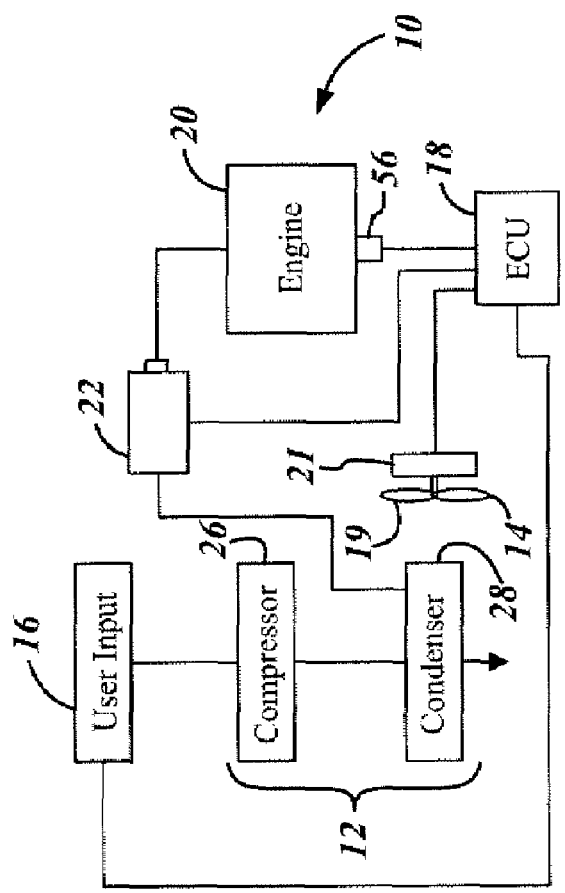
FIG. 1 is a block diagrammatic view of a vehicle system having a cooling system according to one embodiment of the present invention.
Figure 3:
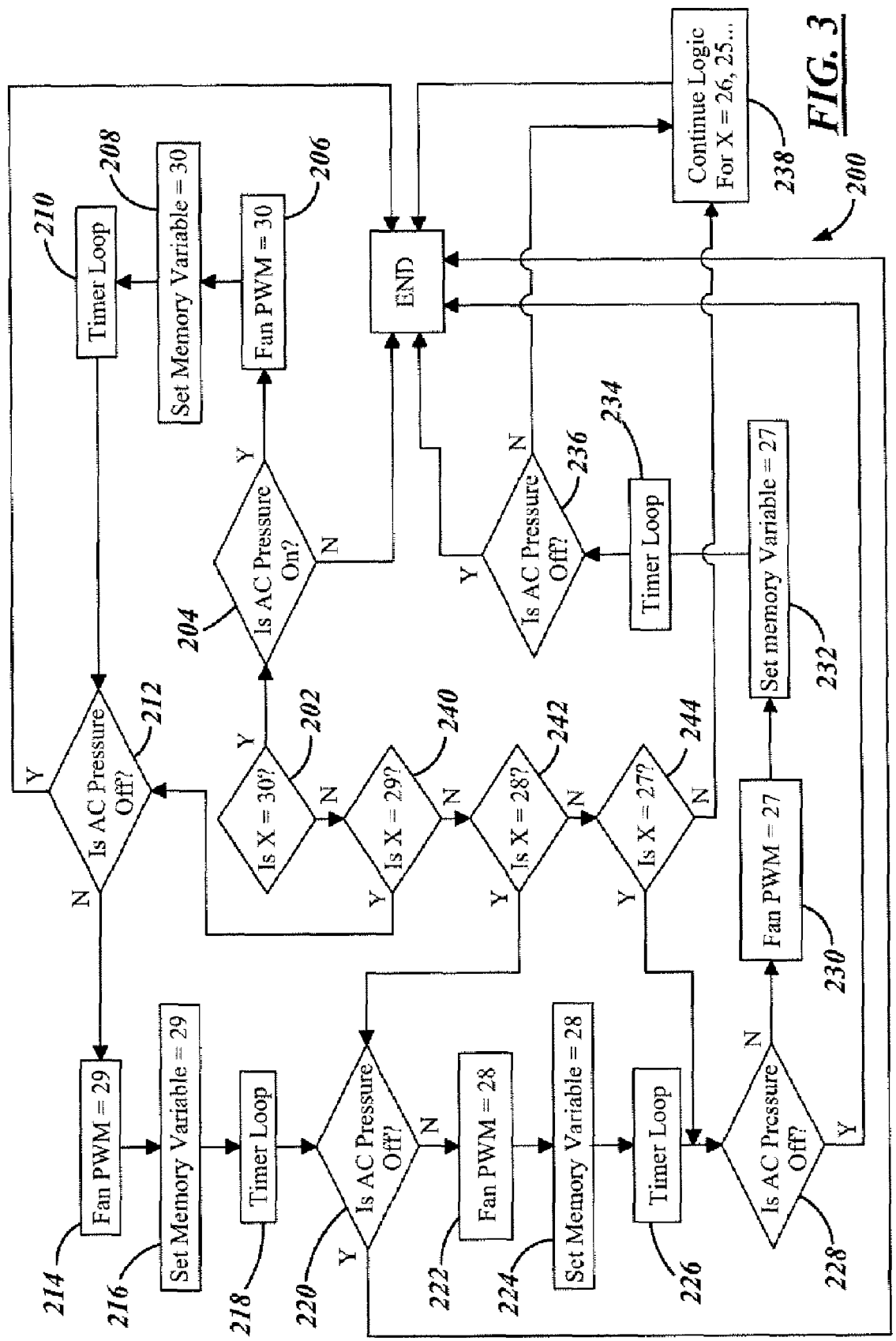
FIG. 3 is a logic flow diagram of at least part of a method for controlling fan speed in accordance with an embodiment of the present invention.

Referring to FIG. 1, a vehicle system 10 including an air conditioning system 12 cooled by a fan 14 is illustrated in accordance with one embodiment of the present invention. The system 10 also includes a user input 16 (AC power switch or fan device switch) controlled by a vehicle operator, and a controller, herein referred to as an engine control unit (ECU) 18, controlling the fan 14 and interacting with a vehicle engine 20. Further, the system 10 includes a vehicle sensor, such as a pressure switch 22 controlling pressure within the AC system 12.

The air conditioning system 12 includes a condenser 28 and a compressor 26 and is activated by a switch 16. The condenser 28 condenses the coolant and operates according to a drive signal output from the engine control unit 18. The compressor 26 compresses the coolant and also operates according to a drive signal output from the engine control unit 18. The air conditioner switch 16 or user input generates an activation signal, which is received by the air conditioning system 12 or the engine control unit 18 when a driver sets the air conditioner switch 16 to "on."

The fan 14 includes a blade 19 and a motor 21 and cools the condenser as a function of pulse-width modulation signals (or other driver signals) from the engine control unit 18.

The compressor pressure switch 22 inputs the pressure status of the compressor 26. Important to note is that the pressure switch 22 is checked during operation of the engine control unit 18, which determines if it is off. The engine control unit 18 cycles until the compressor pressure switch 22 is off, and then stores the current memory variable. Alternate embodiments may include the engine control unit 18 checking whether a different fan device operation has occurred in a predetermined amount of time.

The engine control unit 18 interprets the status of the compressor pressure switch 22 and outputs a signal driving the compressor 26 if the pressure switch 22 is in status "on". The compressor 26 is then driven to cool off the internal portion of the vehicle.

In accordance with another embodiment of the present invention, the engine control unit 18 also interprets the internal temperature detected by the temperature sensor 56 and determines whether the value of the internal temperature is above a preset reference temperature.

When the driver turns on the air conditioner switch 16, the condenser 28 and compressor 26 are driven according to the status of the compressor pressure switch 22. As discussed, the engine control unit 18 includes logic for controlling a modulation fan speed; this logic is further illustrated regarding FIG. 2.

Referring to FIG. 2, a logic flow diagram 100 of a method for controlling a modulated fan speed is illustrated in accordance with another embodiment of the present invention. Logic starts in inquiry block 102 where a check is made whether an AC switch is on. For a negative response, the method ends.

Otherwise, in inquiry block 104, a check is made as to whether an AC pressure switch if. For a negative response when the AC pressure is off, operation block 106 activates, and a predetermined X value (where X is the pulse-width modulation rate), for example 100, is stored. If, on the other hand, the AC pressure switch is on and the value of X equals 100, operation block 108 then automatically lowers the pulse-width modulation rate to a predetermined pulse-width modulation rate (e.g. 30) prior to incrementally shifting the pulse-width modulation rate lower.

Otherwise, if the X value is not equal to 100, the controller decrements X by 1. In operation block 110, the logic requires a wait of Y seconds, whereby Y is equal to, for example, 10. In response to operation block 110, inquiry block 104 reactivates.

The aforementioned control logic controls the fan speed in a vehicle in order to cool the AC system. However, this control logic should not be limited only to controlling AC and may also be utilized by other vehicle systems to command a particular fan speed. The present system and method has the ability to learn and optimize PWM rates through a series of timed loops. When a specific goal is not obtained in a given amount of time, the PWM rate is shifted one increment at a time until the goal is achieved. This method accommodates variation from clutch-to-clutch, variation in air conditioning systems from vehicle-to-vehicle where other systems being controlled (from vehicle-to-vehicle and variations from ambient temperatures).

In operation, a method for controlling a fan motor speed for a vehicle system as a function of an AC pressure switch includes decrementing a pulse-width modulation rate of the fan motor and thereby generating a first decremented pulse-width modulation rate. The method further includes checking the status of the AC pressure switch following a predetermined operation time of the fan motor at the first decremented pulse rate. The pulse-width modulation rate of the fan motor is decremented and a second decremented pulse-width modulation is thereby generated. A check is made of the status of the AC pressure switch following the predetermined operation time of the fan motor at the decremented second pulse-width modulation rate.

A method for controlling the fan motor speed for a vehicle system includes checking activation status of a fan device switch or other sensor and incrementally shifting a pulse switch modulation rate of the fan motor to a new pulse switch modulation rate. A system operation is delayed for a predetermined amount of time as a function of the new pulse-width modulation rate, and a check is made whether the fan device operation is achieved within the predetermined amount of time.

While the invention has been described in connection with at least one embodiment, it will be understood that the invention is not limited to that embodiment. On the contrary, the invention covers all alternatives, modifications, and equivalents as may be included within the spirit and scope of the appended claims.

What is claimed is:

1. A method for controlling the operating speed of a motor that rotates a fan to cool a condenser in an air-conditioning system onboard a vehicle, said method comprising the steps of:
    (a) checking the activation status of a controllable switch that operates said motor of said fan;
    (b) progressively decrementing the pulse-width modulation rate of said motor of said fan from a predetermined maximum pulse-width modulation rate value to a lower new pulse-width modulation rate value while said controllable switch is activated;
    (c) successively operating said motor of said fan, for a predetermined amount of time, as a function of each said new pulse-width modulation rate value; and
    (d) checking whether said condenser has been sufficiently cooled to achieve the functional goal of said fan after each said predetermined amount of time that said motor of said fan is operated.

2. A method as in claim 1, wherein said controllable switch is an air conditioning activation switch, and step (a) is at least partially accomplished by receiving a signal from said air conditioning activation switch indicating that said air conditioning activation switch is activated.

3. A method as in claim 1, wherein said method further comprises the step of activating said controllable switch so as to turn on said air conditioning system.

4. A method as in claim 3, wherein said method further comprises the step of cooling said condenser of said air conditioning system with said fan as a function of activating said air conditioning system with said controllable switch.

5. A method as in claim 1, wherein step (b) is at least partially accomplished by decrementing said pulse-width modulation rate by a predetermined fixed value.

6. A method as in claim 1, wherein step (d) is at least partially accomplished by checking whether a vehicle sensor is on.

7. A method as in claim 1, wherein step (d) is at least partially accomplished by checking whether an air conditioning pressure switch is on.

8. A method as in claim 7, wherein steps (b) and (c) are carried out according to whether said air conditioning pressure switch is on.

9. A method as in claim 6, wherein steps (b) and (c) are carried out according to whether said vehicle sensor is on.

10. A method as in claim 1, wherein said method further comprises the step of checking whether said condenser has been sufficiently cooled to achieve the functional goal of said fan after initially, operating said motor of said fan, for a predetermined amount of time, as a function of said predetermined maximum pulse-width modulation rate value prior to executing steps (b), (c), and (d).

11. A method for controlling the operating speed of a motor that rotates a fan to cool a condenser in an air-conditioning system onboard a vehicle as a function of the activation status of an AC pressure switch or other vehicle sensor, said method comprising the steps of:
    (a) decrementing the pulse-width modulation rate of said motor of said fan from a predetermined maximum pulse-width modulation rate value to a lower new pulse-width modulation rate value for thereby generating a first decremented pulse-width modulation rate;
    (b) checking said activation status of said AC pressure switch or said other vehicle sensor following a predetermined operation time of said motor at said first decremented pulse-width modulation rate to determine whether said condenser has been sufficiently cooled;

(c) successively decrementing said first decremented pulse-width modulation rate of said motor from said new pulse-width modulation rate value to a still lower new pulse-width modulation rate value for thereby generating a second decremented pulse-width modulation rate; and (d) checking said activation status of said AC pressure switch or said other vehicle sensor following a predetermined operation time of said motor at said second decremented pulse-width modulation rate to again determine whether said condenser has been sufficiently cooled.

12. A method as in claim 11, wherein said method further comprises the step of activating an air conditioning unit.

13. A method as in claim 11, wherein steps (b) and (d) are each at least partially accomplished by receiving a signal from said AC pressure switch that indicates whether said AC pressure switch has been activated.

14. A method as in claim 11, wherein step of steps (b) and (d) are each at least partially accomplished by checking whether said other vehicle sensor is on.

15. A method as in claim 11, wherein said method further comprises the step of checking said activation status of said AC pressure switch or said other vehicle sensor following a predetermined operation time of said motor at said predetermined maximum pulse-width modulation rate value to initially determine whether said condenser has been sufficiently cooled.

16. A method as in claim 11, wherein said method further comprises the steps of:

generating an internal temperature signal from an engine onboard said vehicle;

measuring said internal temperature signal as a function of a preset reference temperature; and driving said condenser and a compressor onboard said vehicle as a function of said internal temperature signal and said activation status of said other vehicle sensor.

17. A system for a vehicle, said vehicle system comprising:

an air conditioning unit comprising a condenser and a compressor;

an air conditioning power switch for activating said air conditioning unit;

an air conditioner pressure switch for generating a pressure status signal for said compressor;

a fan comprising a motor and a blade for cooling said condenser; and a controller comprising logic for (i) decrementing a pulse-width modulation rate of said motor from a predetermined maximum pulse-width modulation rate value to a lower new pulse-width modulation rate value for thereby generating a first decremented pulse-width modulation rate, (ii) checking the status of said air conditioner pressure switch following a predetermined operation time of said motor at said first decremented pulse-width modulation rate to determine whether said condenser has been sufficiently cooled, (iii) decrementing said first decremented pulse-width modulation rate of said motor from said new pulse-width modulation rate value to a still lower new pulse-width modulation rate value for thereby generating a second decremented pulse-width modulation rate, and (iv) checking said status of said air conditioner pressure switch following a predetermined operation time of said motor at said second decremented pulse-width modulation rate to again determine whether said condenser has been sufficiently cooled.

18. A vehicle system as in claim 17, wherein said controller further comprises logic for checking said status of said air conditioner pressure switch following a predetermined operation time of said motor at said predetermined maximum pulse-width modulation rate value to initially determine whether said condenser has been sufficiently cooled.

19. A vehicle system as in claim 17, wherein said vehicle system further comprises a temperature sensor for generating an internal temperature signal from an engine onboard said vehicle.

20. A vehicle system as in claim 19, wherein said controller further comprises:

logic for both analyzing said internal temperature signal and measuring said internal temperature signal as a function of a preset reference temperature; and logic for driving both said condenser and said compressor according to said internal temperature signal and said pressure status signal.

* * * * *

UNITED STATES PATENT AND TRADEMARK OFFICE
CERTIFICATE OF CORRECTION

| | | |
|---|---|---|
| PATENT NO. | : 7,362,060 B2 | |
| APPLICATION NO. | : 10/908731 | |
| DATED | : April 22, 2008 | |
| INVENTOR(S) | : Thomas M. Tembreull and Eric L. Charbonneau | |

It is certified that error appears in the above-identified patent and that said Letters Patent is hereby corrected as shown below:

Column 4, Line 52: "after initially, operating" should read -- after initially operating --

Signed and Sealed this
Twenty-eighth Day of February, 2012

David J. Kappos
*Director of the United States Patent and Trademark Office*